United States Patent [19]

Langston

[11] Patent Number: 5,182,018
[45] Date of Patent: Jan. 26, 1993

[54] PROTEIN ABSORBING AQUARIUM FILTER ELEMENT AND METHOD

[76] Inventor: Mark A. Langston, 4201 Neshaminy Blvd. #108-240, Bensalem, Pa. 19020

[21] Appl. No.: 857,271

[22] Filed: Mar. 25, 1992

[51] Int. Cl.⁵ ....................... B01D 24/02; B01D 27/02
[52] U.S. Cl. ................................. 210/282; 210/502.1; 210/503; 210/905; 210/169
[58] Field of Search ............ 210/169, 282, 905, 502.1, 210/503, 290

[56] References Cited

U.S. PATENT DOCUMENTS

| | | | |
|---|---|---|---|
| 2,749,307 | 6/1956 | Ellison | 210/282 |
| 3,643,801 | 2/1972 | Zelenko | 210/169 |
| 3,669,883 | 6/1972 | Huckstedt et al. | 210/44 |
| 3,734,853 | 5/1973 | Horvath | 210/169 |
| 3,814,254 | 6/1974 | Schatz | 210/169 |
| 3,815,547 | 6/1974 | Willinger et al. | 119/5 |
| 3,862,901 | 1/1975 | Wennerblom et al. | 210/665 |
| 3,867,292 | 2/1975 | Cornell | 210/169 |
| 3,965,007 | 6/1976 | Conn et al. | 210/169 |
| 4,104,163 | 8/1978 | Grutsch | 210/794 |
| 4,370,234 | 1/1983 | Marsland | 210/617 |
| 4,622,148 | 11/1986 | Willinger | 210/169 |
| 4,713,173 | 12/1987 | Goldman et al. | 210/169 |
| 4,714,547 | 12/1987 | Willinger | 210/282 |
| 4,863,594 | 9/1989 | Pedretti | 210/169 |
| 4,978,444 | 12/1990 | Rommel | 219/169 |
| 4,988,436 | 1/1991 | Cole | 210/169 |
| 5,019,254 | 5/1991 | Abrevaya et al. | 210/169 |
| 5,078,867 | 1/1992 | Danner | 210/169 |
| 5,087,357 | 2/1992 | Villa | 210/169 |

Primary Examiner—Stanley S. Silverman
Assistant Examiner—Cynthia L. Nessler
Attorney, Agent, or Firm—Oltman and Flynn

[57] ABSTRACT

A filter for absorbing proteins in an aqueous solution which is circulated and constrained to flow through the filter includes numerous absorbent units formed of a polymeric material for absorbing the proteins, sand for slowing the rate of flow of the aqueous solution sufficiently to permit the absorbent units to absorb the proteins, and a water-permeable envelope for containing the absorbent units and the sand. The polymeric material is preferably of an open-cell variety and preferably macroporous, cross-linked polystyrene. The sand is preferably common, washed commercial silica. The envelope is formed of a stretch-resistant nylon mesh to minimize the escape of the sand and the absorbent units. The absorbent units preferably have pores, and the pores have diameters of about 60 to 250 Angstroms and the units preferably have a surface area of about 200 to 900 square meters per gram and a porosity of between 0.20 and 0.90 milliliters of pore per milliliter of bead. A method of removing proteins from a flowing aqueous solution includes the steps of placing protein absorbent polymeric units in the path of the flowing aqueous solution, and placing sand around the protein absorbent polymeric units to slow the flow rate of the aqueous solution.

8 Claims, 1 Drawing Sheet

PROTEIN ABSORBING AQUARIUM FILTER ELEMENT AND METHOD

BACKGROUND OF THE INVENTION

1. Field of the Invention

The present invention relates generally to the field of filters for extracting impurities from water solutions in aquariums, and more specifically to a replaceable filter element for absorbing proteins, which includes an open-cell polymeric absorbent such as macroporous, cross-linked polystyrene, formed into numerous microspheres and mixed with polished sand to reduce the solution flow rate near the polymeric absorbent so that protein absorption can occur, and contained within a nylon envelope.

2. Description of the Prior Art

There have long been filtration systems in aquariums for removing organic material. This organic material includes proteins remaining from aquatic life waste products, uneaten food and dead plant tissues. In the past these proteins have been removed with devices referred to as protein skimmers. Air is bubbled through a passageway containing aquarium water. The bubbles carry the proteins to the top of the skimmer where they are periodically removed by skimming the surface. A problem with these systems is that they tend to be relatively costly, complicated and requiring frequent maintenance and replacement.

An example of such a system is that of Cole, U.S. Pat. No. 4,988,436, issued on Jan. 29, 1991. Cole teaches a multi-step filtration device including a foam pre-filter for mechanical particle removal, a conventional protein skimmer, and a biological filter containing a medium such as imploded synthetic polyether foam material. Within this medium, so-called helpful bacteria are grown for breaking down ammonia. The biological filter is stated to be an open-cell synthetic foam material such as polyether foam. Water flows freely through the foam, however, leaving little chance for the foam to absorb proteins. Problems with Cole include the need for careful maintenance and substantial complexity and expense.

Conn, U.S. Pat. No. 3,965,007, issued on Jun. 22, 1976, discloses a protein skimmer including a vertical water-carrying outer tube coaxially containing a narrower air-carrying tube. Air is pumped down the narrower tube to the base of the outer tube and then diffused into numerous small bubbles which rise through the water contained in the outer tube. These bubbles gather and carry organic compounds to a container at the water surface, from which these compounds are periodically removed. Conn presents all the problems mentioned above of the typical protein skimmer, including high cost and limited effectiveness.

Pedretti, U.S. Pat. No. 4,863,594, issued on Sep. 5, 1989, combines biological and mechanical filtration. Air is bubbled through an isolated side compartment of an aquarium and carries organic material to an absorption pad, while circulating the solution up and through a gravel bed to provide biological filtration. A problem with Pedretti is that the filtration provided is of only limited efficiency. Other problems are that the apparatus is relatively complex, expensive to manufacture and difficult to assemble.

Willinger, U.S. Pat. No. 3,815,547, issued on Jun. 11, 1974, teaches an aquarium filtering device dividing the aquarium into first and second compartments. The water level in one compartment is maintained higher than the level in the other by means of a pump. The device has a perforated lower portion below both water levels and porous filter material is contained within the lower portion. Gravity causes water to flow from the higher water level compartment to the lower water level compartment through the perforations and the porous filter material. A problem with Willinger is that the device separates off a significant portion of the aquarium, and is probably only marginally effective.

Schatz, U.S. Pat. No. 3,814,254, issued on Jun. 4, 1974, discloses an aquarium cleansing device which includes a perforated false bottom upon which gravel is placed. Water is pumped out of spaces beneath the false bottom, drawing water down through the gravel and perforations. Organic waste matter collects on the gravel and is periodically dislodged and removed by creating a strong, pulsing flow through the gravel. A problem with Schatz is that the protein-absorption ability of ordinary gravel is minimal, and therefore the cleaning action is only marginally effective. The false bottom structure itself would also be relatively expensive and complicated to manufacture and assemble.

Horvath, U.S. Pat. No. 3,734,853, issued on May 22, 1973, teaches a suction cleaner for aquariums wherein aquarium water is drawn from the bottom of the main tank into a separate filter box. This water is deposited onto layers of filter material in the box and is drawn through the material, thereby freeing the water of its impurities. Then a tube extending from a pump into the water below the filter material delivers this cleaned water into the top of the main tank. Horvath presents a good design, but is limited by the effectiveness of the filter material available on the market.

Huckstedt, U.S. Pat. No. 3,669,883, issued on Jun. 13, 1972, discloses still another air bubble, foam-flotation, protein skimming device. Air is drawn into the system through a venturi apparatus. Problems with Huckstedt include, once again, high manufacturing costs, needless complexity and marginal effectiveness.

It is thus an object of the present invention to provide a filter element for removing proteins from aquarium water which is highly effective and efficient.

It is another object of the present invention to provide such a filter element which can be easily replaced.

It is finally an object of the present invention to provide such a filter element which is simple and inexpensive to manufacture.

SUMMARY OF THE INVENTION

The present invention accomplishes the above-stated objectives, as well as others, as may be determined by a fair reading and interpretation of the entire specification.

A filter is provided for absorbing proteins in an aqueous solution which is circulated and constrained to flow through the filter which includes numerous absorbent units/ or particles formed of a polymeric material for absorbing the proteins, sand for slowing the rate of flow of the aqueous solution sufficiently to permit the absorbent units to absorb the proteins, and a water-permeable envelope for containing the absorbent units and the sand. The polymeric material is preferably of an open-cell variety and preferably macroporous, cross-linked polystyrene. The sand is preferably common, washed commercial silica. The envelope is formed of a stretch-resistant nylon mesh to minimize the escape of the sand and the absorbent units. The absorbent units preferably have pores, and the pores have diameters of about 60 to 250 Angstroms and the units preferably have a surface area of about 200 to 900 square meters per gram and a porosity of between 0.20 and 0.90 milliliters of pore per milliliter of bead.

A method is provided of removing proteins from a flowing aqueous solution, including the steps of placing protein absorbent polymeric units in the path of the flowing aqueous solution, and placing sand around the protein absorbent polymeric units to slow the flow rate of the aqueous solution.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
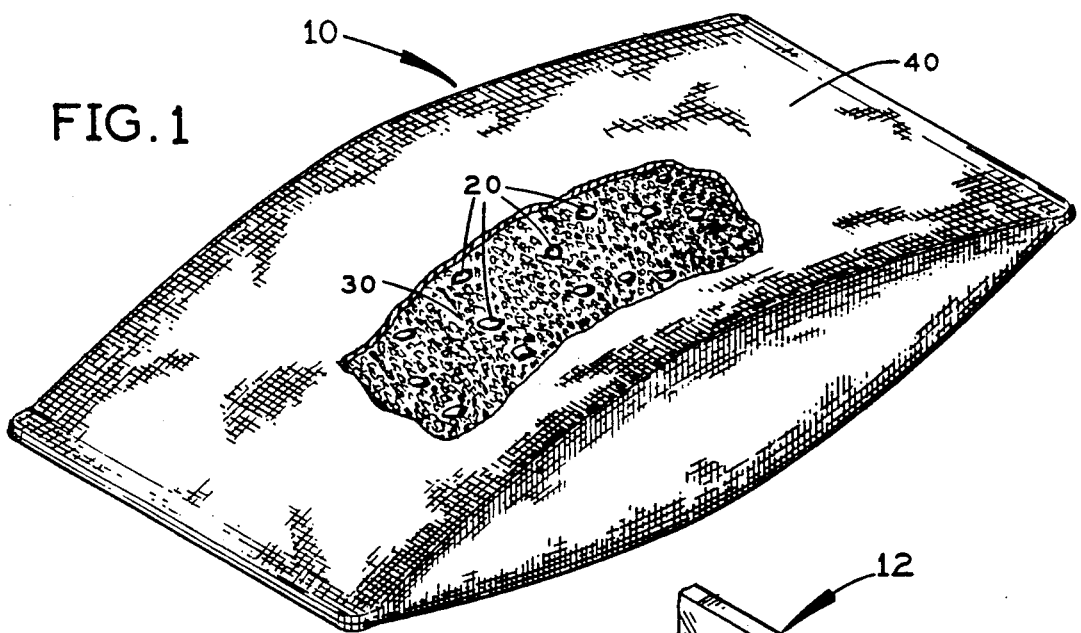
FIG. 1 is a perspective view of the inventive filter element, with a section of the envelope torn away to reveal the polymeric absorbent microspheres and sand inside.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Figure 2:
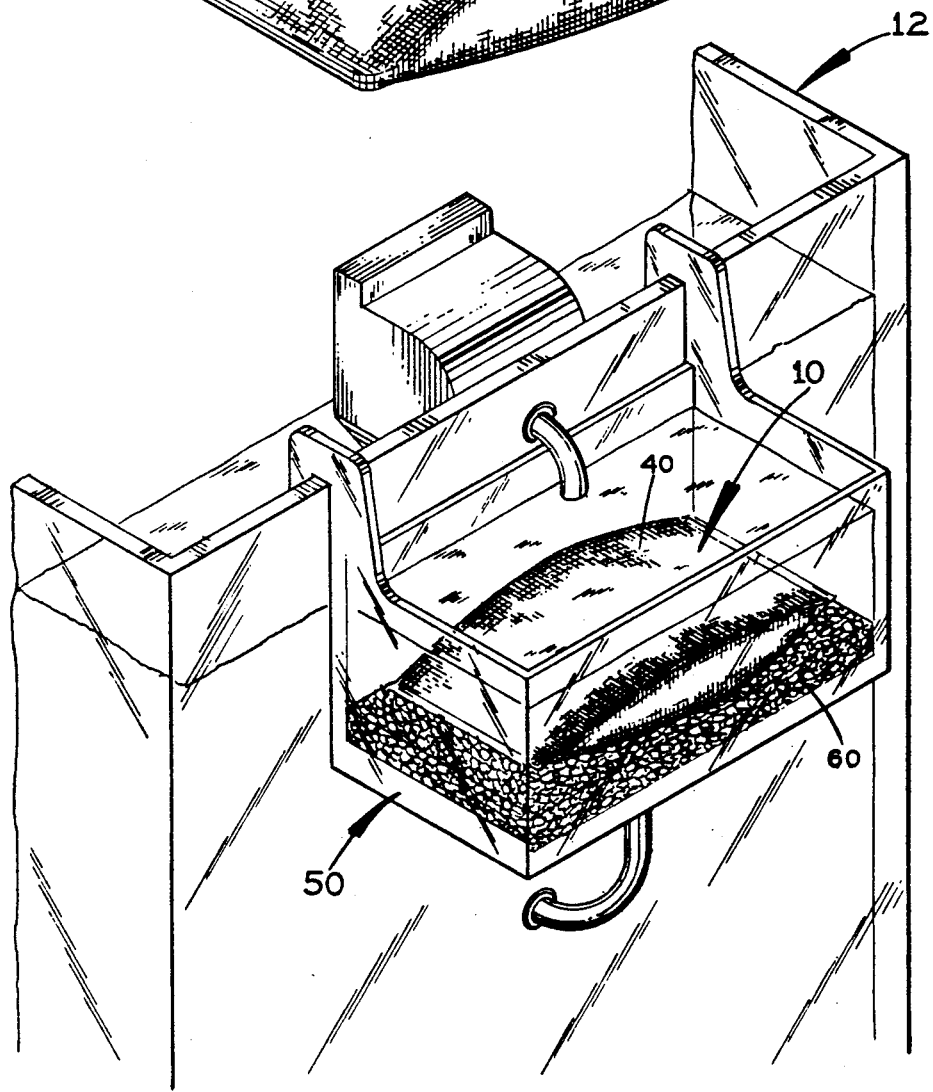
FIG. 2 is a perspective view of part of an aquarium showing the aquarium filter box and the inventive filter element inside the box. The structure adjacent the filter box is a recirculation pump.

Referring to FIG. 1, a protein filter element 10 is disclosed for removing proteins from an aqueous solution in an aquarium 12. Filter element 10 includes very small microspheres 20 of a polymeric absorbent for immobilizing proteins, polished sand 30 for slowing the solution flow rate over microspheres 20 to permit effective absorption, and a nylon envelope 40 for retaining microspheres 20 and sand 30. The slowing of the flow rate over microspheres 20 to permit them to absorb proteins is a critical inventive aspect of filter element 10. Envelope 40 is placed in a conventional aquarium filter box 50, after insertion of the usual activated carbon material 60. See FIG. 2. The circulation of the aqueous solution forces the solution to pass through envelope 40.

Polymeric adsorbents are known in the art but have been primarily used for such applications as decolorization of dyework waste waters, wines, dextrose and caramel, the absorption of vitamins and the removal of surface-active agents, and recovery and concentration of water soluble steroids, enzymes, amino-acids, polypeptides and proteins from various aqueous process streams. The porosity, including pore diameter and volume, must be selected to retain a particular organic species. In the present application the polymeric adsorbents are designed to retain the proteins found in conventional aquariums. Protein molecules are generally polarized so that one end of the molecule is positively charged and the other negatively charged. The negatively charged end is attracted to the positive hydrogen atoms in an aqueous solution and is therefore termed hydrophilic. The positive end is repelled by hydrogen atoms and so is termed hydrophobic.

The absorption process takes advantage of this polarization. The hydrophobic portion of the protein molecule is preferentially absorbed on the hydrophobic surface of the absorbent, while the hydrophilic portion remains oriented toward the aqueous solution.

The preferred polymeric absorbent is macroporous cross-linked polystyrene. The polymeric absorbent is of the open cell variety so that water can readily penetrate the pores. As mentioned above, the polymeric absorbent is preferably provided in the form of hard microspheres 20. The preferred porosity is 0.42 to 0.62 ml pore/ml sphere —dry basis, with an average pore diameter of 90 to 250 Angstroms. The average surface area is preferably 300 to 750 square meters per gram. It is emphasized that these are merely preferred properties which have been found effective in testing, and are not to be construed as limiting.

Polished sand 30 is preferably common, washed silica having the following composition:

| | |
|---|---|
| $SiO_2$ | 99.4% |
| $Al_2O_3$ | 0.13% |
| CaO | 0.03% |
| $Fe_2O_3$ | 0.03% |
| $K_2O$ | 0.02% |
| $TiO_2$ | 0.02% |
| $Na_2O$ | 0.01% |
| MgO | 0.01% |
| L.O.I. | 0.21% |

Again, it is emphasized that this is merely the preferred composition and is not to be construed as limiting.

Envelope 40 is made of a non-stretch nylon mesh so that microspheres 20 and sand 30 do not escape into the aquarium. The preferred envelope 40 dimensions are approximately 4.5 inches by 9.5 inches, similar in size to the old style bean bag. The preferred volume of the agglomeration of absorbent microspheres 20 and polished sand 30 provided would roughly half fill such an envelope 40. These dimensional characteristics are preferred because they permit filter element 10 to fit into most filter boxes on the market today.

METHOD

In practicing the invention, the following method may be used. Absorbent polymer units such as microspheres 20 are placed in the path of circulating aqueous solution. The solution flow rate is slowed by placing sand around the polymer units.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A filter for absorbing proteins in an aqueous solution which is circulated and constrained to flow through the filter, comprising:
   a plurality of macroporous protein-absorbing particles formed of a polymeric material,
   sand for slowing the rate of flow of said aqueous solution sufficiently to permit said macroporous protein-absorbing particles to absorb said proteins,
   a water-permeable envelope for containing said macroporous protein absorbing particles and said sand.

2. A filter according to claim 1, wherein said polymeric material is of an open-cell variety.

3. A filter according to claim 1, wherein said polymeric material is macroporous, cross-linked polystyrene.

4. A filter according to claim 1, wherein said sand is common washed commercial silica.

5. A filter according to claim 1, wherein said envelope is formed of a stretch-resistent nylon mesh to minimize the escape of said sand and said macroporous protein-absorbing particles.

6. A filter according to claim 2, wherein said macroporous protein-absorbing particles have pores, and said pores have diameters of about 60 to 250 Angstroms.

7. A filter according to claim 2, wherein said macroporous protein-absorbing particles have a surface area of about 200 to 900 square meters per gram.

8. A filter according to claim 2, wherein said macroporous protein-absorbing particles have a porosity of between 0.20 and 0.90 milliliters of pore per milliliter of macroporous protein-absorbing particles.

* * * * *